(12) United States Patent
Weber

(10) Patent No.: US 7,607,553 B2
(45) Date of Patent: Oct. 27, 2009

(54) LOWER PORTION FOR ELECTRIC AND ELECTRONIC ENCLOSURE AND ELECTRIC AND ELECTRONIC ENCLOSURE

(75) Inventor: Kenneth Weber, Karjaa (FI)

(73) Assignee: Fibox Oy AB, Jorvas (FI)

( * ) Notice: Subject to any disclaimer, the term of this patent is extended or adjusted under 35 U.S.C. 154(b) by 466 days.

(21) Appl. No.: 11/233,953

(22) Filed: Sep. 23, 2005

(65) Prior Publication Data

US 2006/0070992 A1 Apr. 6, 2006

(30) Foreign Application Priority Data

Oct. 1, 2004 (FI) .................................. 20045366

(51) Int. Cl.
*B65D 45/00* (2006.01)
*B65D 6/28* (2006.01)
*H02G 3/08* (2006.01)
*H01R 13/512* (2006.01)

(52) U.S. Cl. .................. 220/328; 220/4.02; 220/3.8; 174/562

(58) Field of Classification Search .................. None
See application file for complete search history.

(56) References Cited

U.S. PATENT DOCUMENTS

| | | | | |
|---|---|---|---|---|
| 959,150 A * | 5/1910 | Morris | ............................ | 70/90 |
| 1,219,217 A * | 3/1917 | Arndt | ............................ | 292/212 |
| 2,639,179 A * | 5/1953 | Phelps | ............................ | 292/251 |
| 2,930,504 A * | 3/1960 | Hudson | ............................ | 220/3.4 |
| 3,250,559 A * | 5/1966 | Sommerfeld | ............................ | 292/251 |
| 3,734,342 A * | 5/1973 | Patterson | ............................ | 220/3.94 |
| 4,236,562 A * | 12/1980 | Molina | ............................ | 411/103 |
| 4,599,484 A | 7/1986 | Bramwell | | |
| 4,632,269 A * | 12/1986 | Rose | ............................ | 220/3.8 |
| 4,657,462 A * | 4/1987 | Hoen | ............................ | 411/552 |
| 5,361,925 A | 11/1994 | Wecke et al. | | |
| 5,627,340 A * | 5/1997 | Smith et al. | ............................ | 174/482 |
| 5,642,972 A * | 7/1997 | Ellis et al. | ............................ | 411/353 |
| 5,750,924 A | 5/1998 | Sonntag et al. | | |
| 5,765,882 A * | 6/1998 | Trauscht et al. | ............................ | 292/1 |
| 5,848,718 A * | 12/1998 | Colwell | ............................ | 220/4.02 |
| 5,851,095 A * | 12/1998 | Ellis et al. | ............................ | 411/353 |
| 5,880,400 A * | 3/1999 | Leischner et al. | ............................ | 174/17 CT |
| 6,086,480 A * | 7/2000 | Ellis et al. | ............................ | 470/6 |

FOREIGN PATENT DOCUMENTS

DE 40 33 109 4/1992
FR 2604559 A1 * 4/1988

* cited by examiner

*Primary Examiner*—Anthony D Stashick
*Assistant Examiner*—Robert J Hicks
(74) *Attorney, Agent, or Firm*—Darby & Darby

(57) ABSTRACT

The invention relates to a lower portion of an electric and electronic enclosure, comprising a bottom and fastening arrangements for fastening a cover to the lower portion with a bayonet-like fastening, the fastening arrangements comprising a bore and a shoulder-like stopper for receiving a mounting bracket of a spindle-like element. So as to be able to fasten the cover to the lower portion with either bayonet snap lock means or conventional screws, the bore of the lower portion comprises threads for receiving the screw. The invention also relates to an electric and electronic enclosure.

11 Claims, 2 Drawing Sheets

LOWER PORTION FOR ELECTRIC AND ELECTRONIC ENCLOSURE AND ELECTRIC AND ELECTRONIC ENCLOSURE

BACKGROUND OF THE INVENTION

The invention relates to a lower portion of an electric and electronic enclosure, comprising a bottom and fastening arrangements for fastening a cover to the lower portion with a bayonet-like fastening, and the fastening arrangements comprise a bore and a shoulder-like stopper for receiving a mounting bracket of a spindle-like element.

The invention also relates to an electric and electronic enclosure having a lower portion with a bottom, a cover, and fastening means for fastening the cover to the lower portion with a bayonet-like fastening, the fastening means comprising a bore and a shoulder-like stopper arranged to the lower portion, a through-hole, and a stop face formed on the cover, and a spindle-like element that comprises a top end having a shoulder for resting against the stop face of the cover, and at a distance from the top end a mounting bracket for fastening at the shoulder-like stopper of the lower portion to provide a bayonet-like fastening.

Electric and electronic enclosures of the mentioned type and their lower portions are well known. An advantage of a bayonet-like fastening is that the cover of the enclosure can be quickly and easily fastened to the lower portion of the enclosure. A bayonet-like fastening also has the advantage that it can easily be accomplished in such a manner that the cover can flexibly give way when a possible electric arc ignites inside the enclosure, thus preventing any great damage. One drawback with the bayonet-like fastening is that it is not suitable for situations in which the cover of the enclosure needs to remain fixed to the lower portion. In such a case, ordinary screws are usually used to fasten the cover to the lower portion. In addition, the bayonet screw of the bayonet-like fastening has a complex structure, which makes it difficult and expensive to manufacture in comparison with a conventional screw. A further drawback with a bayonet screw is that it cannot be machine-mounted on the enclosure.

Depending on whether the enclosure needs to be such that the cover is fastened to the lower portion with a bayonet-like fastening or with ordinary screws, the user has to select the lower portion of the enclosure to suit the end use. Thus, there must be two different lower portions depending on the manner in which the cover is to be fastened: a first type of the lower portion comprises bores with a shoulder-like stopper for receiving the mounting bracket of the bayonet screw, whereas a second type of lower portion comprises a bore with threads for receiving the threads of an ordinary screw. The need to manufacture and store lower portions of two different types is naturally a disadvantageous solution that correspondingly increases costs. Sometimes, it is necessary to change the fastening method of the enclosure cover (from a bayonet-like fastening to a screw fastening or vice versa) as the application of the enclosure changes.

SUMMARY OF THE INVENTION

It is an object of the invention to provide a novel lower portion of an electric and electronic enclosure, to which lower portion a cover can be fastened with either a bayonet-like fastening or ordinary screws without the afore-mentioned problems.

To achieve this object, the present invention provides a lower portion of an electric and electronic enclosure, comprising a bottom and fastening arrangements for fastening a cover to the lower portion with a bayonet-like fastening, the fastening arrangements comprising a bore and a shoulder-like stopper for receiving a mounting bracket of a spindle-like element, the bore comprising threads for receiving a screw-like element.

The threads are preferably formed closer to the bottom of the lower portion than the shoulder-like stopper. The thread then need not be broken, if, instead of a conventional screw, the cover is to be fastened to the lower portion with a snap lock element having a mounting bracket. The fastening is easy and the thread remains intact, in case the snap lock element later needs to be changed into a conventional screw.

The present invention also provides an electric and electronic enclosure having a lower portion with a bottom, a cover, and fastening means for fastening the cover to the lower portion with a bayonet-like fastening, the fastening means comprising a bore and a shoulder-like stopper arranged to the lower portion, a through-hole, and a stop face formed on the cover, and a spindle-like element that comprises a top end having a shoulder for resting against the stop face of the cover, and at a distance from the top end a mounting bracket for fastening at the shoulder-like stopper to provide a bayonet-like fastening, wherein the bore of the lower portion comprises threads for receiving a screw-like element. When the threads are formed closer to the bottom of the lower portion than the shoulder-like stopper, there is no need to break the threads, as mentioned earlier.

Preferred embodiments of the electric and electronic enclosure are set forth in the attached claims.

The greatest advantages of the electric and electronic enclosure of the invention are that the cover can be fastened thereto either with bayonet snap lock means or conventional screws by using the same bore. Thus, there is no need to have two different lower portions for the enclosure for each fastening method.

The electric and electronic enclosure of the invention provides the advantage that a snap lock means for fastening the cover can, when necessary, be replaced by a conventional screw.

BRIEF DESCRIPTION OF THE FIGURES

The invention will now be described in greater detail by means of a preferred embodiment and with reference to the attached drawing, in which.

DETAILED DESCRIPTION OF THE INVENTION

Figure 1:
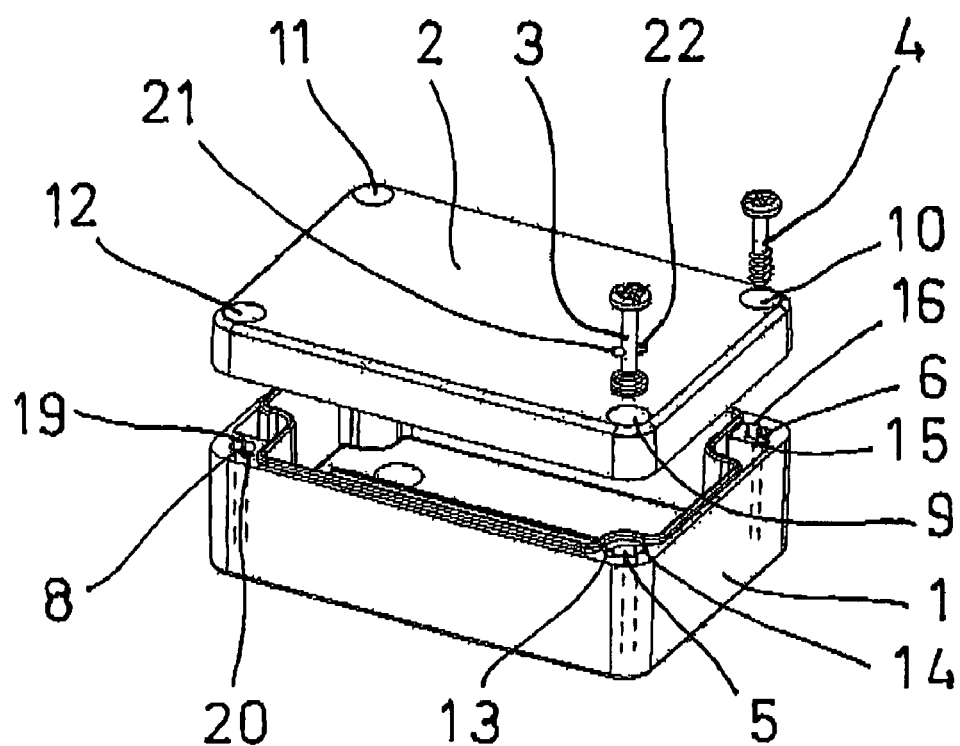
FIG. 1 is a perspective view of an electric and electronic enclosure of the invention.

The electric and electronic enclosure shown in FIG. 1 comprises a lower portion 1 and a cover 2. The cover 2 is at a distance from the lower portion to illustrate the structure of the lower portion 1. Reference numbers 3 and 4 indicate fastening means for fastening the cover 2 to the lower portion 1. The fastening means 3 differs structurally from the fastening means 4: the fastening means 3 is a snap lock means that can be called a bayonet screw, whereas the fastening means 4 is a conventional screw. Both fastening means are drawn into the figure to illustrate that the cover 2 can be fastened to the lower portion with a bayonet screw 3 or a conventional screw 4. For the sake of simplicity, the figure does not show fastening means at each end of the enclosure, even though there should be one in each corner in the example of the figure.

Figure 2:
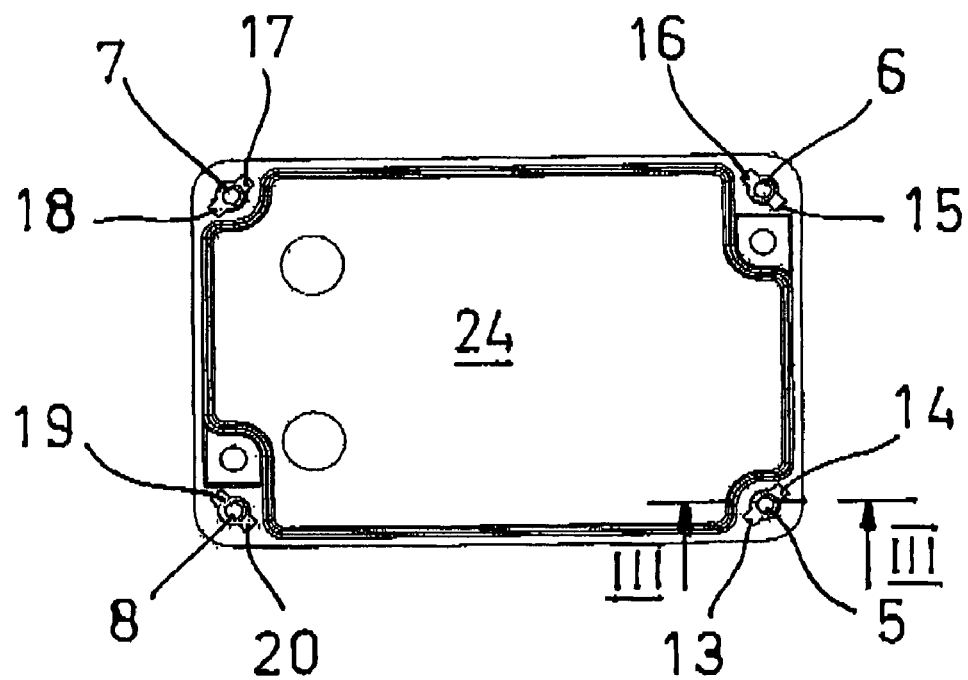
FIG. 2 is a top view of the lower portion of the enclosure of FIG. 1.

Reference number 5 indicates a bore made in the lower portion 1 for receiving a bayonet screw 3. The dashed line shows that the bore 5 continues downward from the top level of the lower portion. Reference number 6 indicates a bore for a screw 4. FIG. 2 further shows bores 7 and 8. The bores 5 to 8 are similar in that either a bayonet screw 3 or a conventional screw 4 can be fastened to them.

Reference numbers 9 to 12 indicate holes in the cover 2, i.e. through-holes for receiving a bayonet screw 3 or alternatively a conventional screw 4. Said holes may differ from what is shown in the figures and be outwardly open in circumference, in which case they are notch-like holes.

FIG. 2 shows that notches 13 to 20 are formed in the bores 5 to 8. The notches 13 to 20 are for receiving mounting brackets 21 to 22 of a bayonet screw 3 in a shape-fit in such a manner that the shaft section of the bayonet screw with its mounting brackets 21, 22 can be inserted from the top through the holes 5 to 8 in a specific position only. When the mounting brackets 21, 22 are inserted through the notches 13, 14, the mounting brackets can be made to rest against a shoulder-like stopper 23 in the bore by slightly turning the bayonet screw, see FIG. 3. The bayonet screw comprises two mounting brackets 21, 22. However, it is clear that the number of mounting brackets may vary. Even one mounting bracket is enough. The mounting brackets shown in the figures are pin-like, but their implementation may differ from that of the figures. Because various implementations are apparent to a person skilled in the art, they will not be described in this context.

Figure 3:
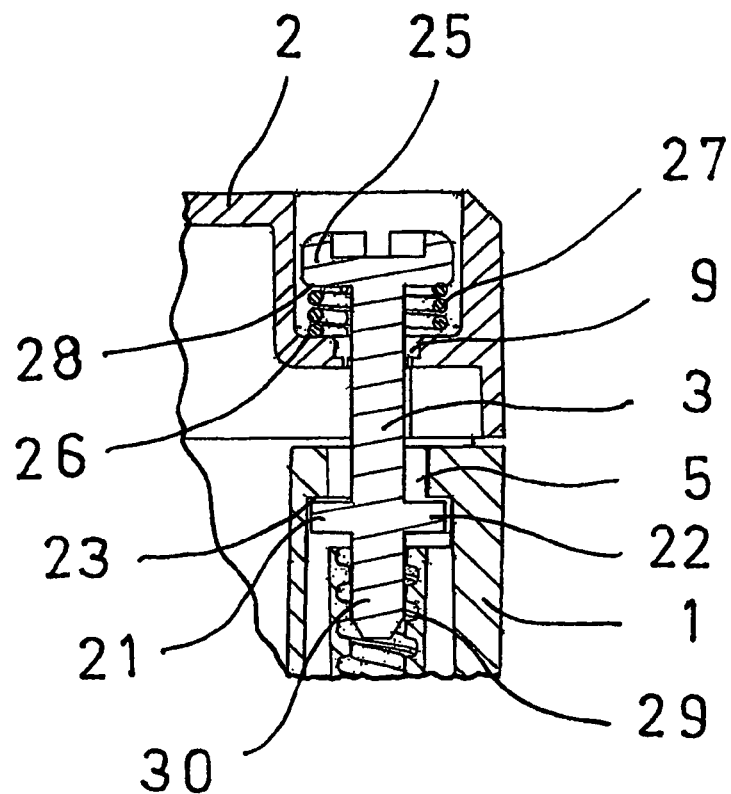
FIG. 3 is a detail of the enclosure of FIG. 1 when the cover of the enclosure is fastened to the lower portion with a bayonet screw.

FIG. 3 shows how the cover 2 fastens to the lower portion 1 with a bayonet screw 3. The view angle of FIG. 3 corresponds to cut III-III in FIG. 2. The mounting brackets 21, 22 of the bayonet screw penetrate the hole 9 in the cover 2 and extend below the shoulder-like stopper 23 in the bore 5 of the lower portion 1 such that they rest against it. The holes 9 to 12 preferably have notches corresponding to the notches 13 to 20. The diameter of the bore 5 immediately below the shoulder-like stopper 23 is bigger than that of the bore above the shoulder-like stopper. The bottom part of the head at the top 25 of the bayonet screw 3 forms a shoulder 28. A spring 27, preferably a helical spring in the form of a compression spring, is arranged between the shoulder 28 and the stop face 26 surrounding the hole 9 of the cover 2. The spring 27 is compressed, whereby it presses the cover 2 with its compression force against the lower portion 1. If, for some reason, a pressure is formed inside the enclosure, which exceeds the compression force of the compression spring, the cover 2 lifts up slightly from the lower portion.

In the solution of FIG. 3, the shoulder 28 rests against the stop face 26 through the spring 27. The bottom end 30 of the bayonet screw 3 is at a distance from the mounting brackets 21, 22 and rests against the wall of the bore 5, whereby the bore supports the bayonet screw. Due to the support, the bayonet screw may have only one mounting bracket instead of two (or more).

Figure 4:
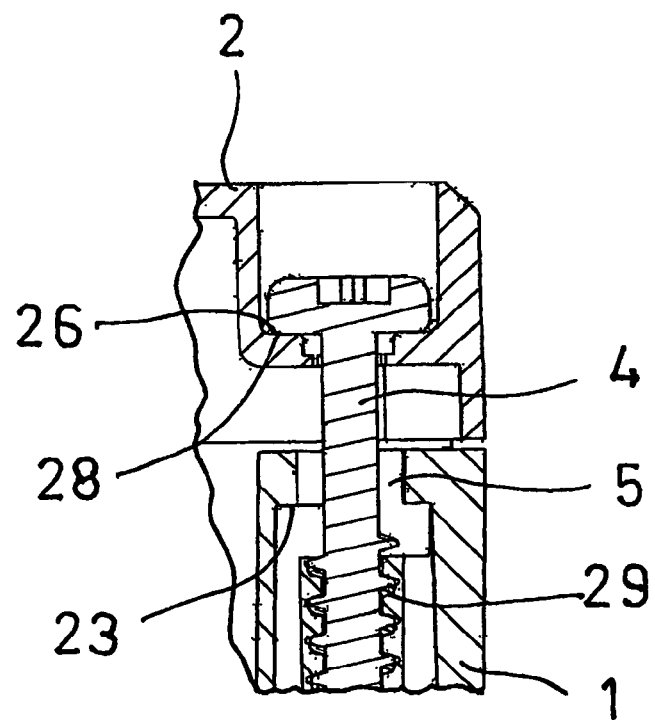
FIG. 4 is a detail of the enclosure of FIG. 1 when the cover of the enclosure is fastened to the lower portion with a conventional screw.

FIG. 4 shows fastening means for fastening the cover 2 to the lower portion 1, which differ from those in FIG. 3. In FIG. 4, the fastening means comprise an ordinary screw 4. For fastening the screw, the bore 5 of the lower portion 1 has threads 29 corresponding to the threads of the screw 4. The threads 29 are formed below the shoulder-like stopper 23. Because of this, the threads 29 are protected from the mounting brackets 21, 22 of the bayonet screw 3—as opposed to having the threads 29 above the shoulder-like stopper, in which case they would need to be broken so as to bring the mounting brackets 21, 22 below the shoulder-like stopper 23. In FIG. 4, the shoulder 28 rests directly against the stop face 26.

Above, the invention is described using an example, and, therefore, it should be noted that within the scope of the attached claims, the invention may in detail be implemented in many different ways. Thus, for instance the number and shape of the bores of the lower portion utilized in fastening the cover may vary. The drawings show four bores (bores 5 to 8), but there may also be just one bore that is positioned in the middle section of the bottom 24 of the lower portion. The bores are shown to have two diametrically opposite notches (see notches 13 and 14), in which case the top parts of the bores can be described as elongate. However, the notches are not absolutely necessary. However, the shape of the top parts of the bores is preferably other than round, because then the bayonet screw can easily be shape-fitted into the bore. Shape fitting refers herein to a bore whose shape corresponds to the shape of the spindle-like element, and the spindle-like element is in a certain position arrangeable inside the bore and by slightly turning (typically approximately 90 degrees) the spindle-like element can be axially locked with respect to the bore. Already one notch makes the bore other than round. The top part of the bore may also be oval. The compression spring 27 is not absolutely necessary.

The invention claimed is:

1. A lower portion of an enclosure for electric or electronic components, the lower portion comprising:
   a bottom; and
   a bore comprising first and second fastening arrangements for fastening a cover to the lower portion,
   wherein the first fastening arrangement is adapted to receive a bayonet fastening and includes a shoulder configured to receive a mounting bracket of a spindle element of the bayonet fastening such that the shoulder forms a stopper that, when the mounting bracket is received in the bore, will affix the mounting bracket in the bore, and
   wherein the second fastening arrangement is readily adapted to receive a screw and includes threads configured to receive the screw.

2. The lower portion of an enclosure according to claim 1, wherein the threads are formed closer to the bottom of the lower portion than the stopper.

3. An enclosure for electric and electronic components comprising a lower portion and a cover, the lower portion including a bottom, and a bore comprising first and second fastening arrangements, the first fastening arrangement including a first shoulder and the second fastening arrangement including threads;
   the cover including a through-hole and a stop face; and
   a bayonet fastening configured to fasten the cover to the lower portion, the bayonet fastening including:
     a spindle element adapted to pass through the hole of the cover and be received by the bore of the lower portion,
     a top end having a second shoulder configured to rest against the stop face of the cover, and
     a mounting bracket disposed on the spindle element at a distance from the top end, the mounting bracket being adapted to pass through the hole of the cover into the bore of the lower portion and be received by the first shoulder of the bore such that the first shoulder forms a stopper to affix the mounting bracket in the bore, wherein the second fastening arrangement and the threads thereof are readily configured to alternatively fasten the cover to the lower portion with a screw.

4. The lower portion of an enclosure according to claim 1, wherein the bore comprises two notches formed on opposite sides of an axis of the bore for receiving a spindle element with two mounting brackets arranged diametrically opposite each other.

5. The enclosure according to claim 3, wherein the threads are formed closer to the bottom of the lower portion than the stopper.

6. The enclosure according to claim 3, wherein the bore is arranged to receive the spindle element in a shape-fit.

7. The enclosure according to claim 3, wherein the bore comprises at least one notch for receiving the mounting bracket of the spindle element.

8. The enclosure according to claim 3, wherein the bore comprises two notches formed on opposite sides of an axis of the bore for receiving the spindle element having two mounting brackets.

9. The enclosure according to claim 7, wherein the through-hole of the cover comprises a notch for receiving the mounting bracket of the spindle element.

10. The enclosure according to claim 3, further comprising a spring arranged between the head of the top end of the spindle element and the stop face of the cover.

11. The lower portion of an enclosure according to claim 1, wherein an opening of the bore comprises at least one notch for receiving the mounting bracket of the spindle element.

* * * * *